United States Patent [19]

Lam et al.

[11] Patent Number: 4,955,833

[45] Date of Patent: Sep. 11, 1990

[54] DYNAMIC DAMPER ON MARINE PROPELLER OR PROPELLER SHAFT

[75] Inventors: Edward K. Lam, Waukegan, Ill.; Heinrich E. Luksch, Kenosha, Wis.

[73] Assignee: Outboard Marine Corporation, Waukegan, Ill.

[21] Appl. No.: 398,325

[22] Filed: Aug. 24, 1989

Related U.S. Application Data

[63] Continuation of Ser. No. 145,106, Jan. 19, 1988, abandoned.

[51] Int. Cl.$^5$ .............................................. F16F 15/12
[52] U.S. Cl. ...................................... 440/49; 440/900; 416/93 A; 416/245 A; 416/500; 74/574
[58] Field of Search ............... 440/49, 900, 52, 83, 440/78; 74/574; 188/378; 464/89; 180; 416/90 A, 93 A, 134 R, 245 A, 500

[56] References Cited

U.S. PATENT DOCUMENTS

| | | | |
|---|---|---|---|
| 2,041,507 | 5/1936 | Zeder | 416/500 |
| 2,116,849 | 5/1935 | Rosner | 440/49 X |
| 3,126,760 | 3/1964 | Peirce | 74/574 |
| 3,242,179 | 3/1966 | Smith | 74/574 |
| 3,246,698 | 4/1966 | Kiekhaefer | 416/93 A |
| 3,334,886 | 8/1967 | Caunt | 188/379 |
| 3,362,251 | 1/1968 | Francis | 74/574 |
| 3,542,487 | 11/1970 | Knuth | 416/134 |
| 3,603,172 | 9/1971 | Hall | 74/574 |
| 3,670,593 | 6/1972 | Troyer | 416/500 |
| 3,861,828 | 1/1975 | Biermann et al. | 465/500 X |
| 3,990,324 | 11/1976 | Fishbaugh et al. | 74/574 |
| 4,207,957 | 6/1980 | Sivers et al. | 180/70 P |
| 4,220,056 | 9/1980 | Bremer, Jr. | 74/574 |
| 4,395,809 | 8/1983 | Whiteley | 29/451 |
| 4,447,214 | 5/1984 | Henrich | 440/900 |
| 4,486,181 | 12/1984 | Cavil | 440/900 |
| 4,642,057 | 2/1987 | Frazzell et al. | 440/52 |
| 4,701,151 | 10/1987 | Vehera | 464/89 |
| 4,787,868 | 11/1988 | Hoshiba et al. | 440/52 |

*Primary Examiner*—Joseph F. Peters, Jr.
*Assistant Examiner*—Edwin L. Swinehart
*Attorney, Agent, or Firm*—Michael, Best & Friedrich

[57] ABSTRACT

Disclosed herein is a marine propulsion device comprising a lower unit including a gear case, a propeller shaft extending in the gear case, an annulus of greater dimension than the propeller shaft and of material weight, and a ring of elastomeric material resiliently connecting the annulus to the propeller shaft is co-axial relation thereto so as to provide for rotation of the annulus in common with rotation of the propeller shaft.

13 Claims, 1 Drawing Sheet

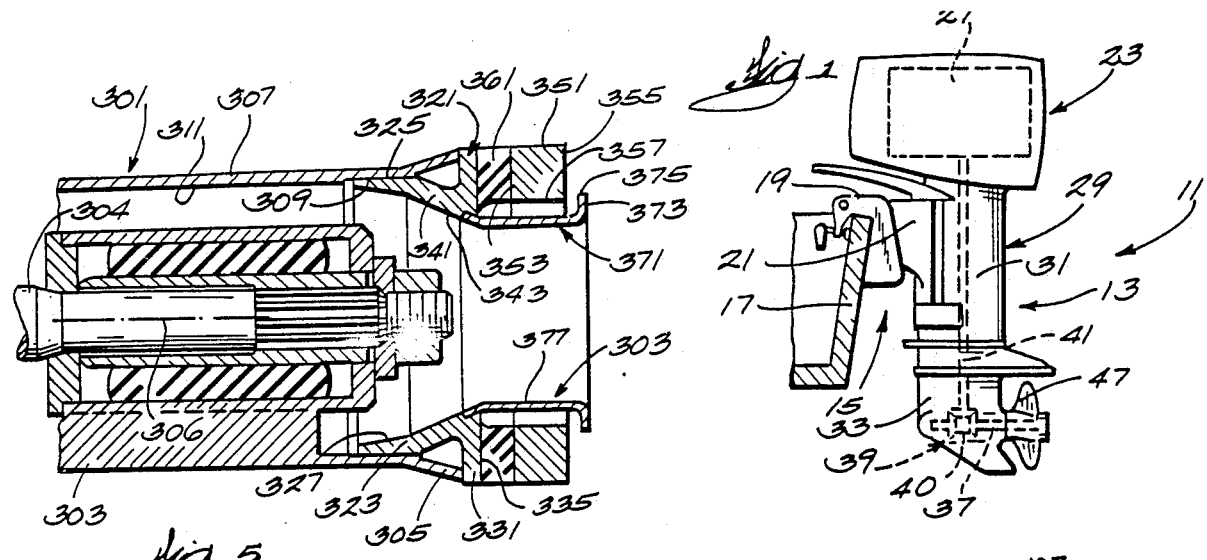
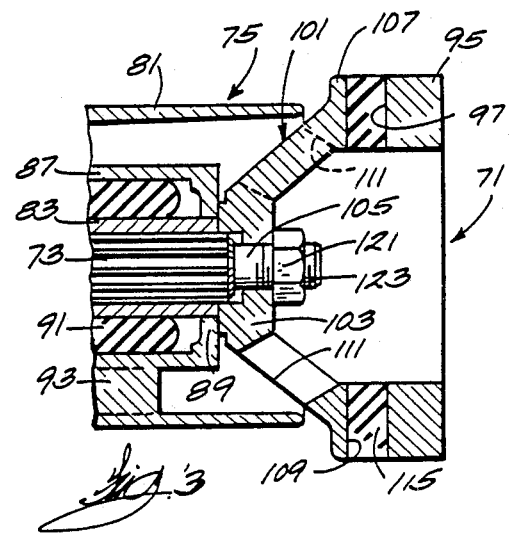
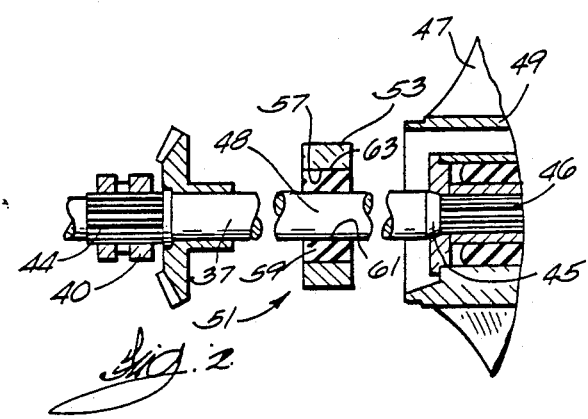
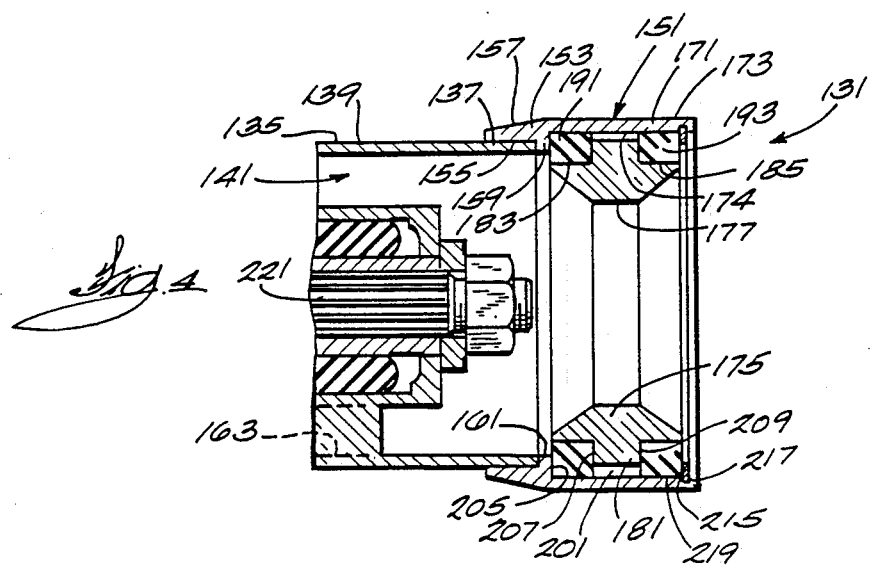

DYNAMIC DAMPER ON MARINE PROPELLER OR PROPELLER SHAFT

This application is a continuation of Ser. No. 145,106, filed Jan. 19, 1988, now abandoned.

BACKGROUND OF THE INVENTION

The invention relates generally to marine propulsion devices, to propeller shafts included in marine propulsion devices, and to propellers mounted on such marine propulsion device propeller shafts. The invention also relates generally to dampers.

The relatively large weight of a propeller positioned at the end of a cantilevered propeller shaft causes bending vibrations during propeller shaft rotation. Such bending vibrations have caused failure by reason of cracking of the gearcase, breaking of the bolts connecting the drive shaft housing and the powerhead, and breakage of the propeller shaft itself.

More particularly, propeller vibration can cause substantial lateral vibration when large horsepower engines operate at wide open throttle. Such vibration causes lateral forces on a propeller shaft, which forces substantially exceed the thrust developed by the propeller and transmitted to the propeller shaft.

In the past, torsional dampers have been placed on drive shafts. Such dampers were characterized by dynamic elements which were attached to a flywheel by a thin elastomeric layer along the outside of the flywheel.

Attention is directed to the following U.S. Pat. Nos.:

| | | |
|---|---|---|
| 3,126,760 | T. H. Peirce | March 31, 1964 |
| 3,242,1791 | J. D. Smith | March 29, 1966 |
| 3,334,886 | A. Caunt | August 8, 1967 |
| 3,362,251 | J. J. Francis | January 9, 1968 |
| 3,603,172 | J. Hall | September 7, 1971 |
| 3,990,324 | Fishbaugh, et al. | November 9, 1976 |
| 4,207,957 | Sivers, et al. | June 17, 1980 |
| 4,220,056 | R. C. Bremer, Jr. | September 2, 1980 |
| 4,395,809 | J. L. Whiteley | August 2, 1983 |
| 4,642,057 | Frazzell, et al. | February 10, 1987 |
| 4,701,151 | Vehera | October 20, 1987 |

SUMMARY OF THE INVENTION

The invention provides a marine propulsion device comprising a lower unit including a gear case, a propeller shaft extending in the gear case, an annulus of greater dimension than the propeller shaft, and means resiliently connecting the metallic annulus to the propeller shaft in co-axial relation thereto so as to provide for rotation of the annulus in common with rotation of the propeller shaft.

In one embodiment, the propeller shaft has an outer surface, the annulus has an inner surface, and the resilient connecting means comprises an elastomeric ring bonded to the propeller shaft and the annulus.

In one embodiment of the invention, the marine propulsion device also includes a propeller removably secured on the propeller shaft, and a carrier removably secured to the propeller shaft rearwardly of the propeller and including a hub, a ring portion, and a plurality of angularly spaced ribs fixedly connecting the ring portion to the hub and defining therebetween a plurality of openings, and the resilient connecting means comprises an elastomeric ring connecting the annulus and the ring portion.

In one embodiment of the invention, the marine propulsion device also includes a propeller mounted on the propeller shaft and including a hub having a rearward end, and a carrier secured to the rearward end of the propeller shaft hub, and the resilient connecting means comprises an elastomeric ring connecting the carrier and the annulus.

The invention also provides a marine propulsion device comprising a lower unit including a gearcase, a propeller shaft extending in the gearcase, a propeller including an inner sleeve mounted on the propeller shaft, an outer hub supporting a propeller blade, a resilient member connecting the sleeve to the outer hub, an annulus of greater dimension than the propeller shaft, and means resiliently connecting the annulus to the propeller shaft in co-axial relation thereto so as to provide for rotation of the annulus in common with rotation of the propeller shaft.

The invention also provides a damper adapted to be releasably secured to a propeller shaft and comprising a carrier including a hub adapted to be removably secured to the propeller shaft rearwardly of a propeller, a ring portion, and a plurality of angularly spaced ribs connecting the ring portion to the hub and defining therebetween a plurality of openings, an annulus, and resilient means connecting the ring portion and annulus for common rotation of the annulus with the carrier.

The invention also provides a propeller comprising a hub having a rearward end, and a damper comprising a carrier secured to the rearward end of the hub and including a portion extending rearwardly of the propeller, an annulus, and resilient means connecting the sleeve portion and the annulus.

The invention also provides a propeller shaft adapted to receive a clutch member and a propeller, which propeller shaft includes a first portion adapted to receive thereon a clutch member, a thrust receiving portion located in rearwardly axially spaced relation from the first portion and adapted to receive thrust from a propeller, and an intermediate portion located between the splined portion and the conical portion, an annulus of greater dimension than the propeller shaft, and means resiliently connecting the annulus to the propeller shaft intermediate portion and in co-axial relation thereto so as to provide for rotation of the annulus in common with rotation of the propeller shaft.

Other features and advantages of the invention will become known by reference to the following general description, and claims, and the appended drawings.

THE DRAWINGS

FIG. 1 is a side elevational view of a marine propulsion device including various of the features of the invention.

FIG. 2 is an enlarged fragmentary view of a portion of the marine propulsion device shown in FIG. 1.

FIG. 3 is an enlarged fragmentary view which is similar to FIG. 2 and which illustrates a second embodiment of the invention.

FIG. 4 is an enlarged fragmentary view which is similar to FIG. 2 and which illustrates a third embodiment of the invention.

FIG. 5 is a fragmentary elevational view, partially in section, of a fourth embodiment of the invention.

Before the embodiments of the invention is explained in detail, it is to be understood that the invention is not limited in its application to the details of construction and the arrangements of components set forth in the following description or illustrated in the drawings. The invention is capable of other embodiments and of being practiced or carried out in various ways. Also, it is to be understood that the phraseology and terminology used herein is for the purpose of description and should not be regarded as limiting.

GENERAL DESCRIPTION

Shown in FIG. 1 is a marine propulsion device which is in the form of an outboard motor 11. However, the invention is applicable to other forms of marine propulsion devices such as, for example, stern drive units.

The outboard motor 11 shown in FIG. 1 includes a propulsion unit 13 and suitable means 15 for releasably securing the propulsion unit 13 to a boat transom 17 including a transom bracket 19 and a swivel bracket 21 which is connected to the transom bracket 19 about a horizontal axis to facilitate vertical tilting movement of the swivel bracket 21 and propulsion unit 13 and which is connected to the propulsion unit 13 about a vertical axis for facilitating steering movement of the propulsion unit 13 relative to the swivel bracket 21.

The propulsion unit 13 also includes a powerhead 23 including an internal combustion engine 27 which is supported on a lower unit 29 including a drive shaft housing 31 and a gearcase 33 which is fixed to the lower end of the drive shaft housing 31.

Rotatably supported in the gearcase 33 is a propeller shaft 37 which is connected through a reversing transmission 39, including a shiftable dog clutch or member 40, to a drive shaft 41 which extends through the drive shaft housing 31 and which is drivingly connected to the engine 27.

The propeller shaft 37, as shown in FIG. 2, includes a splined portion 44 which is adapted to drivingly receive the dog clutch 40, as well as a thrust receiving portion 45 which, in the disclosed construction, is conical and which is axially rearwardly spaced from the splined portion 44. In addition, the propeller shaft 37 includes a second splined portion 46 adapted to drivingly receive a propeller 47 which includes one or more blades (shown fragmentarily) extending from a propeller hub 49. The second splined portion 46 can be located either in overlapping relation to the thrust receiving portion 45 or rearwardly thereof. In the disclosed construction, the thrust receiving portion 45 is located forwardly of the second splined portion 46. Between the thrust receiving portion 45 and the first splined portion 44, the propeller shaft 37 also includes an intermediate portion 48.

Suitable means can be provided for releasably fixing the propeller 47 on the rearward splined portion 46 of the propeller shaft 37.

As thus far described, the construction is conventional.

In order to dampen lateral propeller shaft vibration, the marine propulsion device 11 includes a damper 51 which is fixed to the propeller shaft 37 and preferably to the intermediate portion 48 of the propeller shaft 37, i.e., forwardly of the propeller 47. More particularly, the damper 51 includes an annulus 53 which is preferably metallic and which includes an inner circular surface 57 and which has a relatively substantial mass producing a material amount of weight.

The damper 51 also includes means resiliently connecting the propeller shaft 37 to the annulus 53. While other constructions can be employed, in the illustrated construction, such means comprises an elastomeric ring 59 which is sandwiched between and connected to the propeller shaft 37 and to the annulus 53. While other constructions can be employed, in the illustrated construction, the ring 59 has an inner surface 61 bonded to the outer surface of the propeller shaft 37 and an outer surface 63 bonded to the inner surface 57 of the annulus 53. Preferably, the damper 51 is located within the gearcase 33 and between the reversing transmission 39 and the propeller 47. The damper 51 serves to substantially reduce lateral propeller shaft vibration without being apparent to the public.

Shown in FIG. 3 is another form of a propeller shaft damper which is indicated by the reference numeral 71 and which is removably carried by a propeller shaft 73 rearwardly of a propeller 75. More particularly, in the construction illustrated in FIG. 3, the propeller 75 is of the conventional type in which exhaust gases pass through the propeller and conventionally comprises an outer hub 81 from which extend one or more propeller blades (not shown). The conventional propeller 75 also includes an inner sleeve 83 which is in splined telescopic driving connection with the propeller shaft 73, and an inner hub 87 which includes an inwardly extending flange 89 and which is resiliently connected to and driven from the sleeve 83 by an elastomeric or resilient member 91. The inner hub 87 is spaced from and connected to the outer hub 81 by a series of angularly spaced spokes or webs 93 only one of which is shown. Exhaust gas is discharged through the openings defined by the outer and inner hubs 81 and 87 and by the webs 93.

The damper 71 also includes a annulus 95 which is preferably metallic and which is of about the same diameter as the outer propeller hub 81 and which has a face 97 transverse to the propeller shaft 73. As before, the annulus 95 is preferably constructed of metal and is of sufficient mass to provide a material amount of weight. The annulus 95 is centrally open to facilitate exhaust gas flow.

In addition, the damper 71 includes a carrier 101 comprising a hub 103 which is received on a reduced diameter extension 105 of the propeller shaft 73 and which axially abuts the inturned flange 89 of the inner propeller hub 87. In addition, the carrier 101 includes a ring portion 107 having a face 109 extending transversely of the propeller shaft 85, together with a series of angularly spaced ribs or spokes 111 which fixedly extend between and connect the hub 103 and ring portion 107 and which define therebetween open spaces for exhaust gas flow from the propeller 75.

Still further in addition, the damper 71 includes resilient means securing or connecting the annulus 95 to the carrier 101. While other constructions could be employed, in the disclosed construction, such means comprises an annular ring 115 of elastomeric material which is suitably connected, as for example, by bonding, to the face 109 of the ring portion 107 and to the face 97 of the metallic annulus 95.

Suitable means are provided for removably retaining the damper 71 on the propeller shaft 85. While other constructions can be employed, in the illustrated construction, such means comprises a nut 121 which is threaded on a threaded end portion 123 of the propeller shaft extension 105 and which bears against the damper hub 103 to retain the damper hub 103 in axially adjacent engagement with the propeller 75.

It is particularly noted that in this embodiment, exhaust gas discharge from the propeller 75 between the outer and inner hubs 81 and 87 is permitted to flow rearwardly through the spaces between the spokes 111 of the carrier 101.

Shown in FIG. 4 is still another embodiment comprising a damper 131 which is suitably fixed, as for instance, by welding, by press fitting, by set screws (not shown) or by other suitable means, to an outer surface 135 of a rearward end 137 of an outer propeller hub 139 of a conventional propeller 141 which affords exhaust gas discharge through the outer hub.

More particularly, the damper 131 comprises a carrier 151 which is in the general form of a sleeve and which includes an attachment section or portion 153 which has an inner bore or surface 155 received on the outer surface 135 of the propeller outer hub 139 and which includes a radially outwardly and rearwardly tapering outer surface 157.

The attachment portion 153 also includes an inwardly extending flange 159 which abuts the rearward end of the propeller outer hub 139 and which has an inner surface 161 with a diameter corresponding to the diameter of the inner surface 163 of the propeller outer hub 139.

The carrier 151 also includes, rearwardly of the attachment section or portion 153, a cylindrical sleeve portion 171 which includes a cylindrical outer surface 173 extending rearwardly from the inclined outer surface 157 and which includes an inner surface defining a socket 174 arranged to receive a resiliently supported annulus 175. More particularly, the annulus 175 preferably comprises a ring of metal which has sufficient mass to provide material weight and includes a central aperture 177 to facilitate rearward flow of exhaust gas from the propeller 141. While other constructions could be employed, in the disclosed construction the annulus 175 includes an outer surface with an annular raised projection or collar 181 extending radially outwardly between forwardly and rearwardly spaced circumferential surfaces 183 and 185. While other arrangements could be employed, in the disclosed construction, the annulus 175 is supported in the sleeve portion 171 of the carrier 151 by a pair of elastomeric rings 191 and 193 having outer surfaces engaged with the sleeve portion 171 and inner surfaces engaged with the circumferential surfaces 183 and 185 of the annulus 175.

It is noted that the projection 181 has a radial extent such that an open area 201 exists between the rearward sleeve portion 171 and the outwardly extending collar or projection 181. In addition, the forwardly located elastomeric ring 183 engages the carrier surface 205 as well as the forward surface 207 of the annular projection 181. The rearward elastomeric ring 193 also engages the rearward face 209 of the projection 181.

If desired, the elastomeric rings 191 and 193 can be bonded to both the carrier 151 and the metallic annulus 175. However, in the disclosed construction, the elastomeric rings 191 and 193 are bonded solely to the annulus 175 and the resulting assembly is removably received within the socket 174 in the sleeve portion 171 and removably retained therein by a snap ring 215 received in a groove 217 in the inner surface 219 of the sleeve portion 171. The groove 217 is axially located so that receipt of the snap ring 215 serves to compress the elastomeric rings 191 and 193 so as thereby to provide for common rotation of the annulus 175 with the propeller shaft 221 carrying the propeller 141.

Shown in FIG. 5 is still another embodiment of a propeller 301 which discharges exhaust gas and coolant, which includes thereon a damper 303, and which is adapted to be mounted on a propeller shaft 304 for rotation about a propeller shaft axis 306.

More specifically, in the construction shown in FIG. 5, the propeller 301 includes an outer hub 303 having a rearward portion 305 which flairs radially outwardly and rearwardly and a cylindrical portion 307 which extends forwardly from the flaired portion 305. Adjacent the flaired portion 305, the cylindrical portion 307 includes an inner surface 309 having a diameter which is slightly larger than the diameter of the inner surface 311 immediately adjacently forwardly from inner surface 309.

Secured to the inner surface 309 of the hub 303 forwardly of the flaired portion 305 is an annular carrier 321 including an attachment portion 323 which is welded or otherwise suitably secured to the inner surface 309. The attachment portion 323 has an outer surface 325 in engagement with the hub inner surface 309 and has an inner surface 327 which extends radially inwardly and rearwardly. The carrier 321 also includes a flange portion 331 which extends generally perpendicularly to the propeller shaft axis 306 and outwardly to adjacent the point of maximum diameter of the flaired portion 305. Along its forward face, the flange portion 331 preferably engages the end of the flaired portion 305. In addition, the flange portion 331 includes a face 335 extending generally transverse to the propeller axis 306.

The carrier 321 also includes a connecting portion 341 which extends between the attachment portion 323 and the flange portion 331 and which has an inner surface 343 which extends from the attachment portion inner surface, and which flairs radially inwardly and rearwardly at a slightly sharper angle than the inner surface 327. At its rearward end, the connecting portion 341 merges into the flange portion 331.

The carrier 321 also includes an inertia ring or annulus 351 which is preferably of metal to provide a substantial amount of weight and which includes a forward face 353 transverse to the propeller axis 306 and a rearward face 355.

As in the other embodiments, means are provided for resiliently securing the inertia ring 351 to the carrier 321. While other constructions could be employed, in the disclosed construction, such means comprises an elastomeric ring 361 which is sandwiched between and bonded to each of the face 353 of the inertia ring 351 and the face 335 of the flange portion 331 of the carrier 321. Consequently, the inertia ring 361 has common rotation with the propeller 301.

Means are provided for isolating the elastomeric ring 361 and the inertia ring 351 from the turbulence of the exhaust gas and coolant discharge which exit through the propeller hub 303. While various constructions can be employed, in the illustrated construction, such means comprises an annular shield 371 which is generally cylindrical, which extends rearwardly from the carrier 321 in radially inwardly spaced relation from the elastomeric ring 361 and the inertia ring 351 and which, at its outer end, includes an outwardly extending flange 373. The flange 373 is axially spaced from the rearward face 355 of the inertia ring 351 and has a radially outer edge 375 having a greater diameter than the inner diameter 357 of the inertia ring 351. The annular shield 371 includes an inner surface 377 which merges smoothly with the inner surface 343 of the connecting portion 341 of the carrier 321.

Any suitable means can be provided for suitably fixing the shield 371 to the carrier 321.

Thus, the inertia ring 351, and the elastomeric ring 361 are isolated from the turbulent action of the exhaust gas and coolant discharged from the propeller 301. In addition, such isolation protects the elastomeric ring 361 from the heat effect of the exhaust due to the spacing of the elastomeric ring 361 and inertia ring 351 from the shield 371 which prevents contact of the heated gases and water with the elastomeric ring 361. In addition, it is noted that, in normal usage, water would occupy the space between the shield 371 and the elastomeric ring 361 and the inertia ring 351.

In operation, the presence of the dampers 51, 71, and 131, and 303 serves to reduce lateral vibrational forces exerted by the propeller shafts 73, 85, 221, and 304. Location of the dampers 71, 131, and 303 in adjacent relation to the propellers 75, 141, and 301 at the cantilevered end of the propeller shafts 85, 221, 304 is particularly effective in reducing lateral vibratory forces exerted by the propeller shafts 85, 221, and 304.

It is especially noted that the disclosed resilient connection between the annulus and the propeller shaft functions, as compared to the resilient bushing between the propeller outer hub and the inner sleeve of the propeller, without being subject to propulsive thrust.

Various of the features of the invention are set forth in the following claims:

We claim:

1. A marine propulsion device comprising a lower unit including a gear case, a propeller shaft extending in said gear case and having an outer circumferential surface, a propeller mounted on said propeller shaft, said propeller including a hub having a rearward end, a carrier having an axis and secured to said rearward end of said propeller hub, a rigid annulus having a larger inner circumferential surface than said outer circumferential surface of said propeller shaft, and an elastomeric ring resiliently connecting said annulus to said carrier in co-axial relation thereto so as to provide for rotation of said annulus in common with rotation of said propeller shaft.

2. A propeller comprising an inner sleeve adapted to be mounted on a propeller shaft, an outer hub supporting a propeller blade and having a rearward end, and a resilient member connecting said sleeve to said outer hub, and a damper comprising a carrier secured to said rearward end of said outer hub and including a portion extending rearwardly of said propeller blade, a rigid annulus, and resilient means connecting said carrier portion and said annulus.

3. A propeller in accordance with claim 2 wherein said rearward end of said hub has an outer surface, wherein said carrier includes a first inner surface secured to said outer surface of said hub and wherein said carrier includes a second inner surface rearwardly of said first inner surface, wherein said annulus has an outer surface, and wherein said resilient connecting means comprises an elastomeric ring connected to said second inner surface of said carrier and said outer surface of said annulus.

4. A propeller in accordance with claim 3 wherein said elastomeric ring is bonded to said outer surface of said annulus and to said inner surface of said carrier.

5. A propeller in accordance with claim 3 wherein said carrier includes a socket, wherein said annulus includes an outer surface including a radially outwardly projecting collar, and wherein said resilient connecting means comprises a pair of elastomeric rings bonded to said outer surface on opposite sides of said collar to thereby provide an annulus assembly receivable into said socket, and means on said carrier for releasably retaining said annulus assembly in said socket and for frictionally engaging said annulus assembly with said carrier to provide common rotation of said carrier and said annulus assembly.

6. A propeller comprising an inner sleeve adapted to be mounted on a propeller shaft, an outer hub supporting a propeller blade and having a rearward end, and a resilient member connecting said sleeve to said outer hub, and a damper comprising a carrier secured to said rearward end of said outer hub, extending rearwardly of said propeller blade, and including a portion having a rearward surface transverse to said outer hub, a rigid annulus having a surface transverse to said outer hub, and an elastomeric ring connected to said transverse surface of said portion of said carrier and said transverse surface of said annulus.

7. A propeller in accordance with claim 6 wherein said elastomeric ring is bonded to said transverse surface of said annulus and to said transverse surface of said carrier.

8. A propeller comprising a hub including a rearward portion which flairs radially outwardly and rearwardly and has an outer rearward end, and a damper comprising a carrier secured to said rearward outer end, extending rearwardly of said propeller, and including a portion having a rearward surface transverse to said propeller hub, a rigid annulus having a surface transverse to said propeller hub, and resilient means connecting said portion and said annulus and comprising an elastomeric ring connected to said transverse surface of said portion of said carrier and to said transverse surface of said annulus.

9. A propeller in accordance with claim 8 wherein said portion has a radially inner end, and wherein said carrier includes a connecting portion including an inner surface extending radially inwardly and rearwardly to adjacent said radially inner end of said flange portion.

10. A propeller comprising a hub having a rearward end, and a damper comprising a carrier secured to said rearward end of said hub, extending rearwardly of said propeller, and including a portion having a rearward surface transverse to said propeller hub, a shield extending rearwardly from said portion, a rigid annulus having a surface transverse to said propeller hub and extending in radially outwardly spaced relation to said shield, and resilient means connecting said portion and said annulus and comprising an elastomeric ring connected to said transverse surface of said portion of said carrier and said transverse surface of said annulus and in radially outwardly spaced relation to said shield.

11. A propeller in accordance with claim 10 wherein said annulus includes a radially inner surface, and wherein said shield includes a cylindrical portion having a rearward end, and a flange portion extending radially outwardly from said rearward end of said cylindrical portion in rearwardly spaced relation to said annulus and radially outwardly of said radially inner surface of said annulus.

12. A marine propulsion device comprising a lower unit including a gearcase, a propeller shaft extending in said gearcase, a propeller including an inner sleeve mounted on said propeller shaft, an outer hub supporting a propeller blade, and a resilient member connecting said sleeve to said outer hub, a rigid annulus of greater dimension than said propeller shaft, and an elastomeric ring resiliently connecting said annulus and said outer hub of said propeller and with said annulus in co-axial relation to said propeller shaft, whereby to provide for rotation of said annulus in common with rotation of said propeller shaft.

13. A marine propulsion device comprising a lower unit including a gearcase, a propeller shaft extending in said gearcase, a propeller including a hub supporting a propeller blade, a rigid annulus of greater dimension than said propeller shaft, and an elastomeric ring resiliently connecting said annulus and said propeller hub and with said annulus in co-axial relation to said propeller shaft, whereby to provide for rotation of said annulus in common with rotation of said propeller shaft.

* * * * *